United States Patent
Suen et al.

(10) Patent No.: US 7,365,748 B2
(45) Date of Patent: *Apr. 29, 2008

(54) UNIQUE METHOD FOR PERFORMING HORIZONTAL AND VERTICAL VIDEO DECIMATION WITHIN A WIRELESS DEVICE

(75) Inventors: Ruei-Shiang Suen, Dublin, CA (US); Weidong Li, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 10/917,006

(22) Filed: Aug. 12, 2004

(65) Prior Publication Data

US 2006/0033731 A1 Feb. 16, 2006

(51) Int. Cl.
*G06T 11/00* (2006.01)
(52) U.S. Cl. .................. 345/428; 382/243; 345/698
(58) Field of Classification Search ............ 345/428, 345/603, 694–698; 370/347; 455/414.4, 455/457, 566; 382/243
See application file for complete search history.

(56) References Cited

U.S. PATENT DOCUMENTS 6,943,805 B2* 9/2005 Snyder et al. ............. 345/428
7,071,939 B2* 7/2006 Suen et al. ................ 345/428

* cited by examiner

*Primary Examiner*—Richard Hjerpe
*Assistant Examiner*—Kevin M Nguyen
(74) *Attorney, Agent, or Firm*—Garlick Harrison & Markison

(57) ABSTRACT

A method of presenting graphical images within a wireless terminal that includes receiving an original graphical image, having a source resolution, to be presented on a display screen. The native pixel resolution of the display screen may differ from that of the original graphical image. A complex decimation pattern when applied to the image allows the original graphical image to be resized from the source resolution of the original graphical image to a decimated resolution operable to be displayed within the native resolution of the display screen. Decimated pixels need not be further processed to reduce the processing requirements imposed on the system processor. Operations normally associated with the decimated portions of the image may be offloaded from the processing module to improve system efficiency.

29 Claims, 14 Drawing Sheets

UNIQUE METHOD FOR PERFORMING HORIZONTAL AND VERTICAL VIDEO DECIMATION WITHIN A WIRELESS DEVICE

BACKGROUND

1. Technical Field

The present invention relates generally to cellular wireless communication systems, and more particularly to a unique method to perform horizontal and vertical video documentation within a wireless terminal of a cellular wireless communication system.

2. Related Art

Cellular wireless communication systems support wireless communication services in many populated areas of the world. While cellular wireless communication systems were initially constructed to service voice communications, they are now called upon to support data and video (multimedia) communications as well. The demand for video data communication services has exploded with the acceptance and widespread use video capable wireless terminals and the Internet. Video and data communications have historically been serviced via wired connections; cellular wireless users now demand that their wireless units also support video and data communications. The demand for wireless communication system video and data communications will only increase with time. Thus, cellular wireless communication systems are currently being created/modified to service these burgeoning demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice, video, data or multimedia communications between the MSC and a serving base station. The MSC then routes these communications to another MSC or to the PSTN. Typically, BSCs route data communications between a servicing base station and a packet data network that may include and couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 4.615 ms frame that includes 8 slots of, each including eight slots of approximately 577 μs in duration. Each slot corresponds to a Radio Frequency (RF) burst. A normal RF burst, used to transmit information, typically includes a left side, a midamble, and a right side. The midamble typically contains a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless communication systems require significant processing ability to encode and decode the information contained within the RF bursts. This decision may be further influenced by changing radio conditions and the desired quality level to be associated with the communications.

Video coding standards typically provide video representation in the form of a sequence of rectangular two-dimensional frames. As software is becoming increasingly more powerful with improved microelectronic technologies providing new programmable processors, additional functionalities may be added. These include the application of multimedia content or visual information in a mobile connection. Already today wireless terminals are not limited to only voice communications. Other types of data including real time or streaming multimedia may be provided. The need for visual communication is much stronger when using a mobile wireless device utilized in multiple environments. This reinforces the relevance of audiovisual communications in a mobile environment.

When a wireless handset performs video operations according to the JPEG standard or streaming video according to the MPEG standard, the wireless terminal is often required to change the image to correspond to particular display sizes. Such changes may be expanding the size of the image or compressing the size of the image to fit a desired display size. These operations are typically performed poorly causing the image to lose quality or require significant processing resources that overload the system processor, DSP, or memory of the wireless terminal. Users want access to this audiovisual information in real time. This requires that the multimedia be of acceptable quality at low enough rates to be effectively communicated in the cellular wireless environment. The motion picture expert group (MPEG) standard addresses these emerging needs. These standards include standards such as MPEG 4 and MPEG 7 which specify a way of describing various types of multimedia information, including still pictures, video, speech, audio, graphics, 3D models, and synthetic audio and video. The MPEG 4 standard was conceived with the objective of obtaining significantly better compression ratios than could be achieved by conventional coding techniques. However, to achieve low data rates often requires compute intensive operations by the processors. Additionally, image decimation to resize an image in real time for display within the wireless terminal may be computationally demanding in the video processor.

Unlike a desktop computer coupled to a network via a landline connection a mobile wireless terminal will have a limited data rate between itself and the servicing base station. Additionally, the processors within the wireless terminal are assigned multiple processing duties. The increased processing associated with requires additional processing power in order to maintain real time or streaming audio/visual communications. The addition of these processing requirements within the wireless terminal requires new methods with which to balance the processing requirements of the system processor while maintaining these real time audio/visual communications.

BRIEF SUMMARY OF THE INVENTION

In order to overcome the shortcomings of prior devices, the present invention provides a system and method of presenting graphical images within a wireless terminal that substantially addresses the previously identified needs as well as other needs. This method includes receiving an original graphical image that is to be presented on a display screen. This original graphical image has a source resolution. The native pixel resolution associated with the display screen may differ from that of the original graphical image. A complex decimation pattern may be determined using a computer system or algorithm wherein the complex decimation pattern allows the original graphical image to be resized from the source resolution of the original graphical image to a decimated resolution operable to be displayed within the native resolution of the display screen. Once this complex decimation pattern has been determined, the original graphical image may be decimated according to the pattern in order that the decimated graphical image may then be presented on the display screen. Decimated pixels need not be further processed to produce the processing requirements imposed on the system processor.

This complex decimation pattern has a repeating integer pattern wherein the integers are not all equal. This decimation pattern describes the number of undecimated horizontal and/or vertical lines separating decimated horizontal and/or vertical lines. This complex decimation pattern allows an aspect ratio of the original graphical image to remain constant when compared to that of the decimated graphical image presented on the wireless terminals display. This allows an original graphical image received by a camera or other graphical input device with any source resolution to be properly processed for display on the display screen. Additionally, this allows any graphical image received by a wireless terminal through a received communication to be displayed on the wireless terminals display screen.

Another embodiment of the present invention provides a wireless terminal having a radio frequency (RF) front-end, a baseband processor operably coupled to the RF front-end, a camera or other graphical input device and a graphical interface. This graphical interface receives captured graphical images or images received through RF communications, and processes these graphical images for presentation within the display screen. This interface determines the source resolution of the graphical image whether it be from the camera sensor or received communications and then determines a native pixel resolution associated with the display screen. The camera interface then implements a complex decimation pattern that allows the original graphical image to be resized from the source resolution to a decimated resolution operable to be displayed within the native resolution of the display screen. The graphical image is then decimated according to the complex decimation pattern and displayed within the display screen. This allows graphical or video images to be presented within a display screen while maintaining the aspect ratio of the image.

Yet another embodiment of the present invention provides a video processing module within a wireless terminal operable to perform complex decimation of graphical images that are to be displayed within the wireless terminal. A graphical interface receives the original graphical images that are to be presented on the display screen of the wireless terminal. These original graphical images have a source resolution. The display screen has a native resolution which may differ from the source resolution of the original graphical image. The display screen operably couples to the graphical interface that is operable to implement a complex decimation pattern that allows the original graphical image to be resized from the source resolution to a decimated resolution in order that the decimated graphical image is displayed within the native resolution of the display screen. The graphical images associated with the embodiments of the present invention may be formatted according to a graphical image standard such as joint photographic expert group (JPEG), motion picture expert group standards (MPEG), such as MPEG 1, MPEG 2, MPEG 4, MPEG 7, and MPEG 21 as well as other graphical image standards known to those skilled in the art.

Other features and advantages of the present invention will become apparent from the following detailed description of the invention made with reference to the accompanying drawings.

DETAILED DESCRIPTION OF THE DRAWINGS

Figure 1:
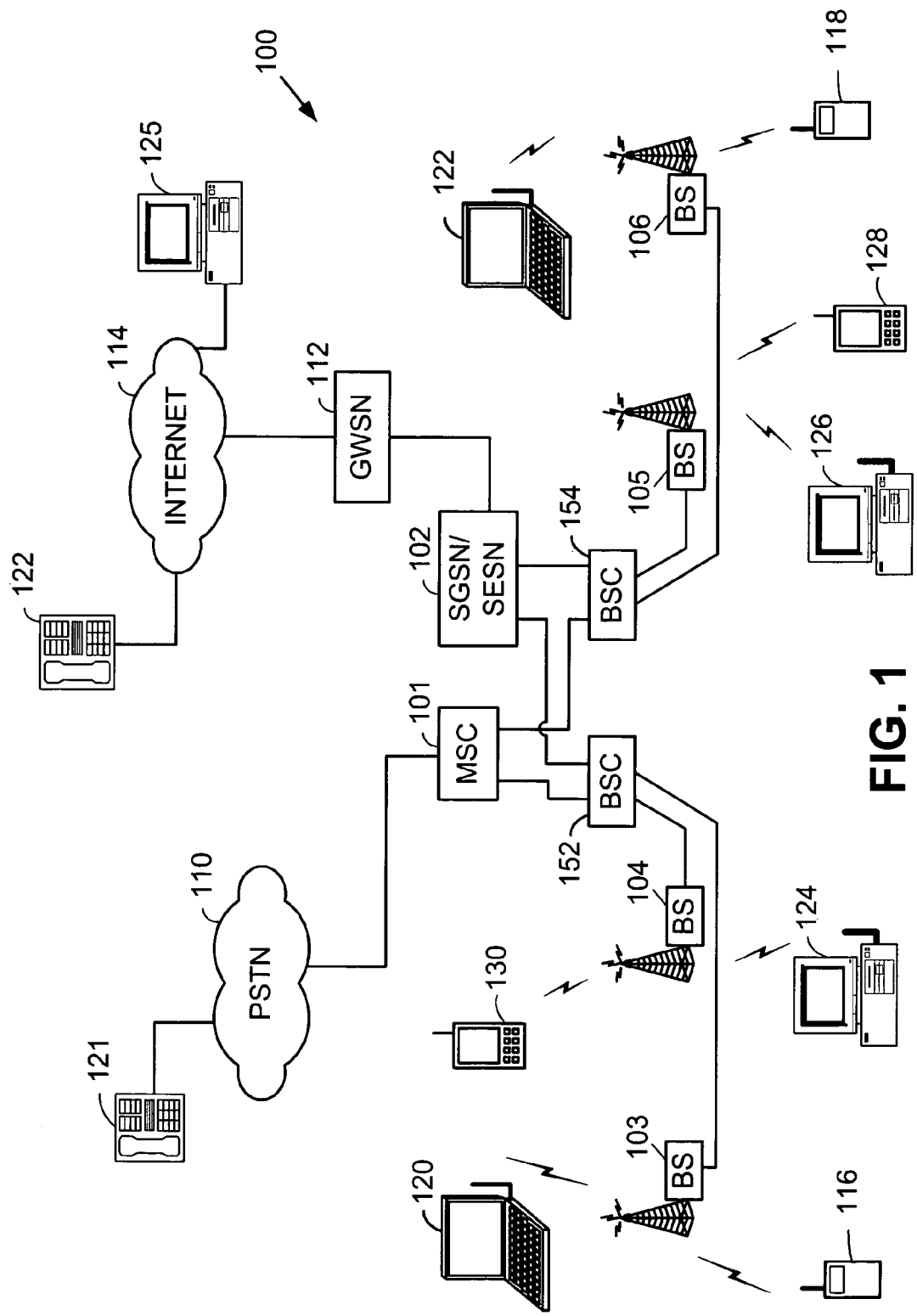
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional multimedia capable terminal 121 couples to the PSTN 110. Multimedia capable terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital voice, video, multimedia, and data communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103-106. As illustrated, wireless terminals may include video and multimedia capable cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data, audio and video communications. Many of these data operations have significant download data-rate (forward link) requirements and upload data-rate (reverse link) requirements in order to support video and multimedia communications. Some or all of the wireless terminals 116-130 are therefore enabled to support the EDGE operating standard, the GSM standard and may support the GPRS standard.

Wireless terminals 116-130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each GSM frame. The wireless terminal is able to process the RF bursts contained in these slots and still service reverse link transmissions and the other processing requirements of the wireless terminal.

Figure 2:
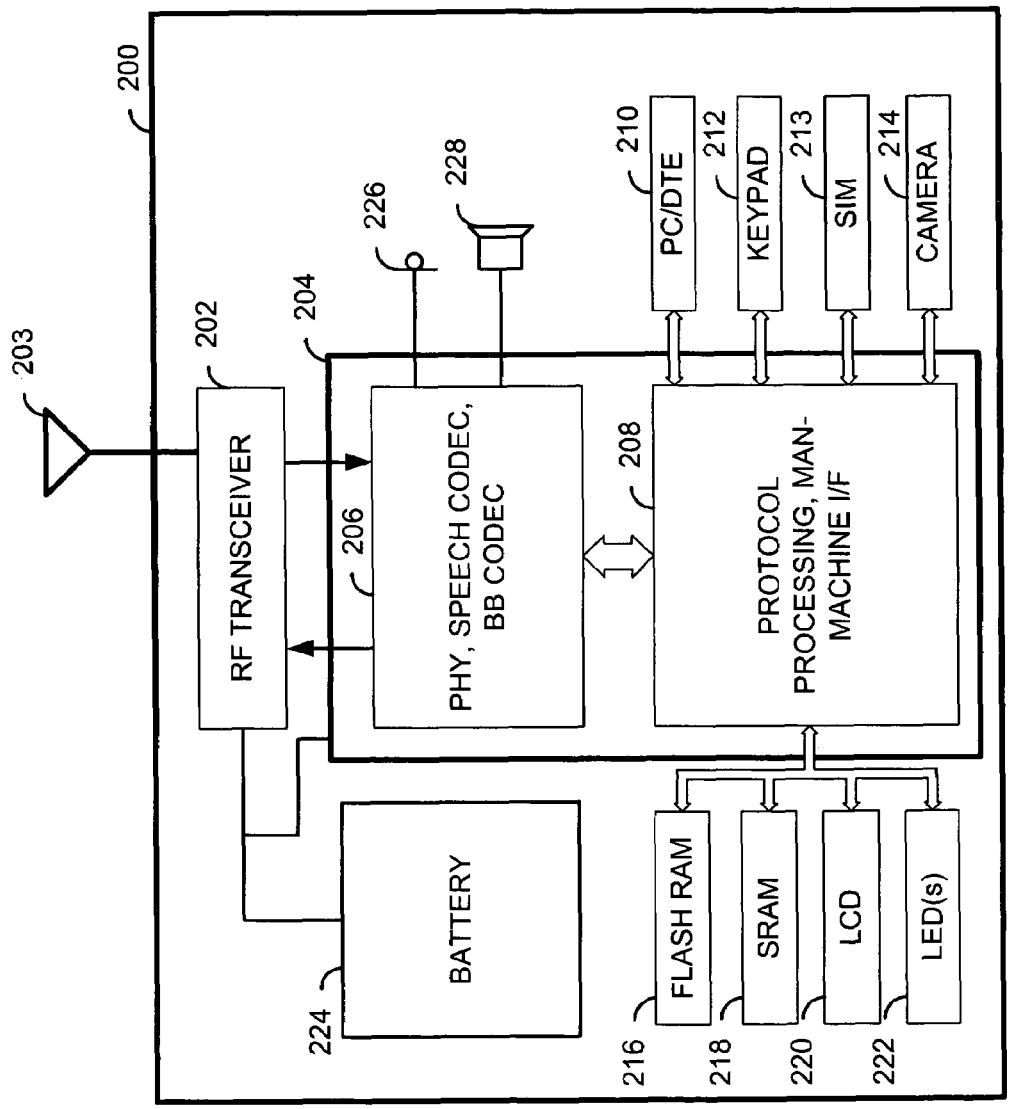
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a case. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
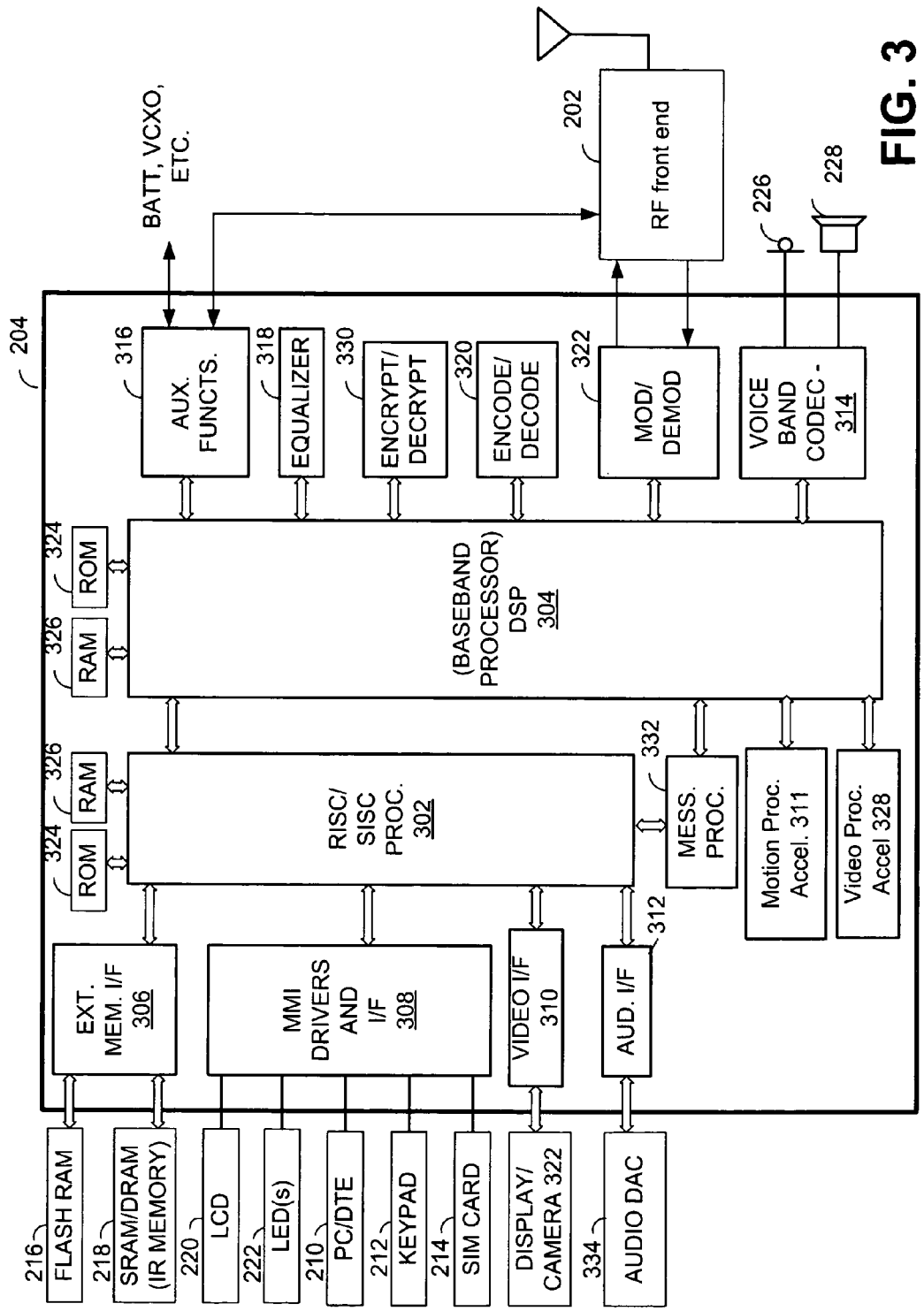
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, a motion processor accelerator 311, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and a video process accelerator module 328.

The interconnections of FIG. 3 are one example of a manner in which these components may be interconnected. Other embodiments support additional/alternate couplings. Such coupling may be direct, indirect, and/or may be via one or more intermediary components. Functions of the video interface 310 in processing images to be displayed will be described in more detail with reference to FIGS. 9-11. These processor accelerators may further include arithmetic logic units (ALU) operable to perform specific tasks such as motion processing. The ALUs receive data from and output data to registers operable to temporarily store an input for or an output of the at least one ALU. These registers allow the data to be processed to be transferred between the DSP and accelerators RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 couple to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications that may contain both audio and visual information from the servicing base station. In one embodiment the RF front end 202 and base band processor 204 receive and process RF bursts from servicing base stations. The combination of RF front end 202 and base band processor 204 are operable to receive RF bursts transmitted according to a transmission scheme wherein the transmission scheme includes both a modulation format and a coding format. Base band processor 204 to produce a data block decodes sequences of soft decisions, extracted from the RF bursts. The sequence of soft decisions may decode successfully into the data block as indicated by error correction coding results.

Figure 4:
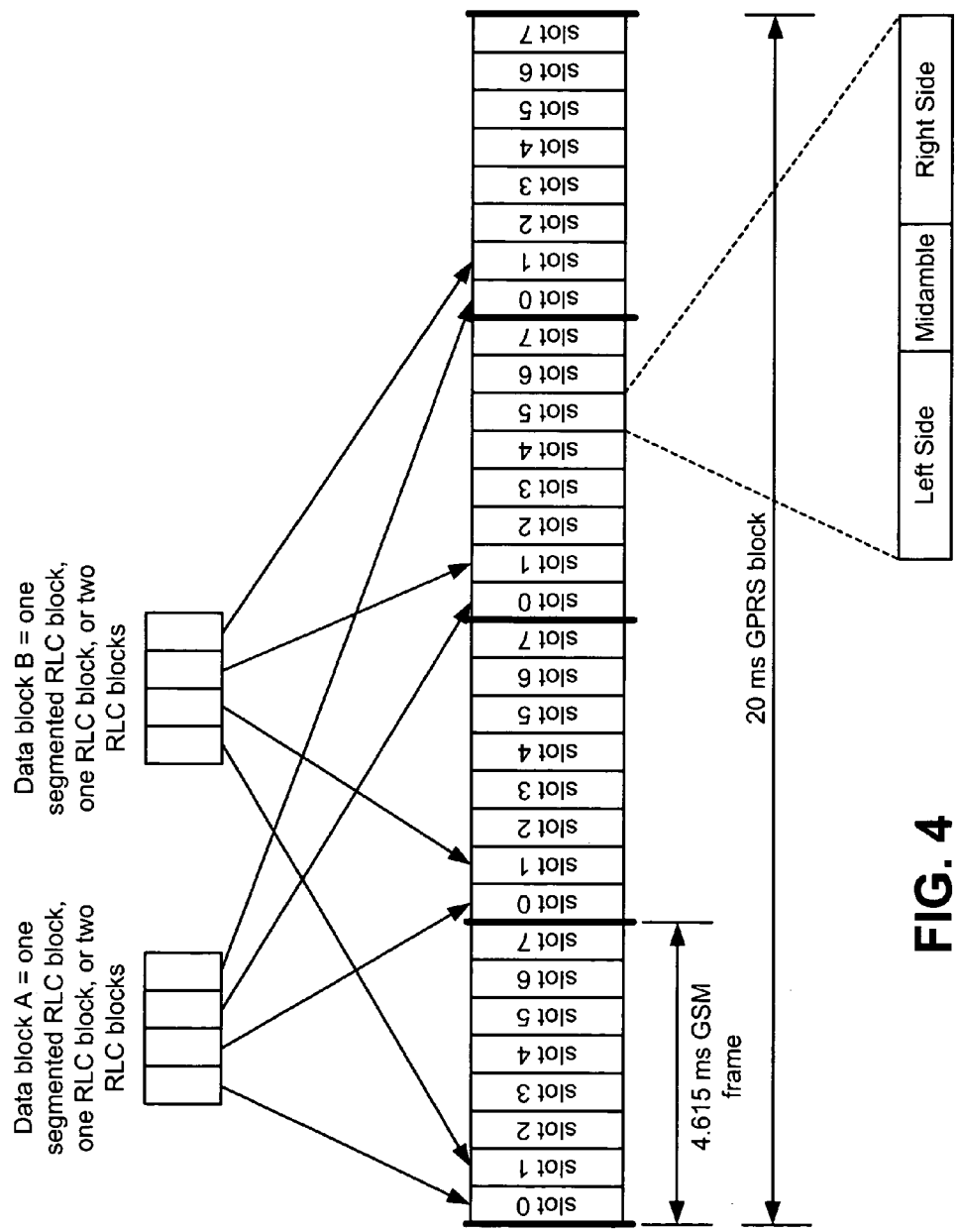
FIG. 4 is a block diagram illustrating the general structure of a GSM frame and the manner in which data blocks are carried by the GSM frame.

FIG. 4 is a block diagram illustrating the general structure of a GSM frame and the manner in which data blocks that may contain audio, video, and data communications, are carried by the GSM frame. The GSM frame is 4.615 ms in duration, including guard periods, and each of which includes eight slots, slots 0 through 7. Each slot is approximately 577 µs in duration, includes a left side, a midamble, and a right side. The left side and right side of a normal RF burst of the time slot carry data while the midamble is a training sequence.

The RF bursts of four time slots of the GPRS block carry a segmented RLC block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode of each set of slots, i.e., slot n of each sub-frame, for the GSM frame is consistent for the GSM frame. Further, the MCS mode of differing sets of slots of the GSM frame, e.g., slot 0 of each sub-frame vs. any of slots 1-7 of each sub-frame, may differ. This ability allows LA to be implemented. As will be described further with reference to FIG. 5, the wireless terminal 200 may be assigned multiple slots for forward link transmissions that must be received and processed by the wireless terminal 200.

Figure 5:
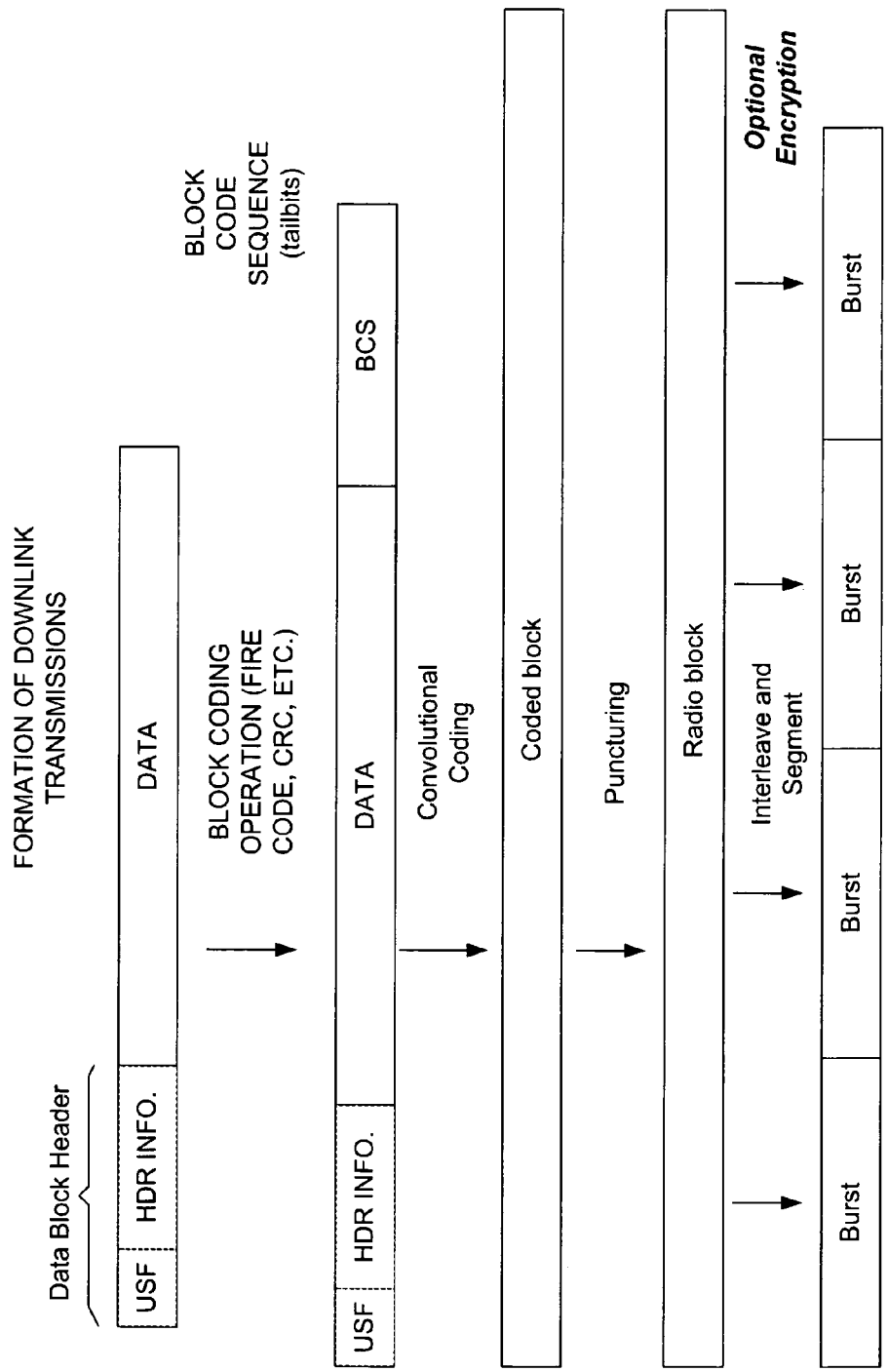
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some coded bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
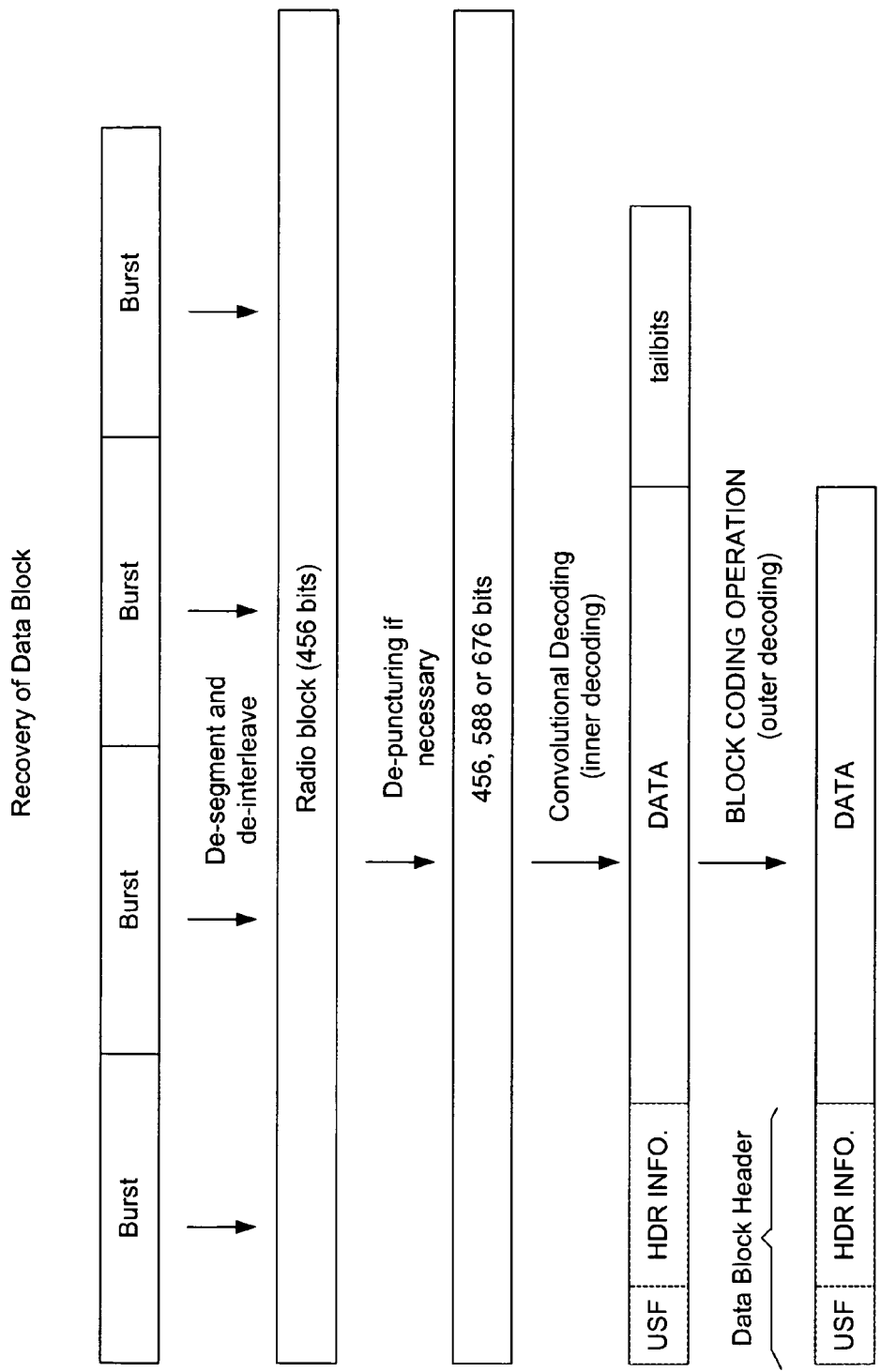
FIG. 6 is a block diagram illustrating the recovery of a data block from a down link transmissions.

FIG. 6 is a block diagram depicting the various stages associated with recovering a data block from RF bursts. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. For MCS 1-4, the decoded data block includes the data block header and the data, for MCS 5-9, data block and header block are coded separately. Successful decoding may be signaled by appropriate tailbits appended to the data following convolutional decoding (error correction coding).

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions may be described later.

Figure 7:
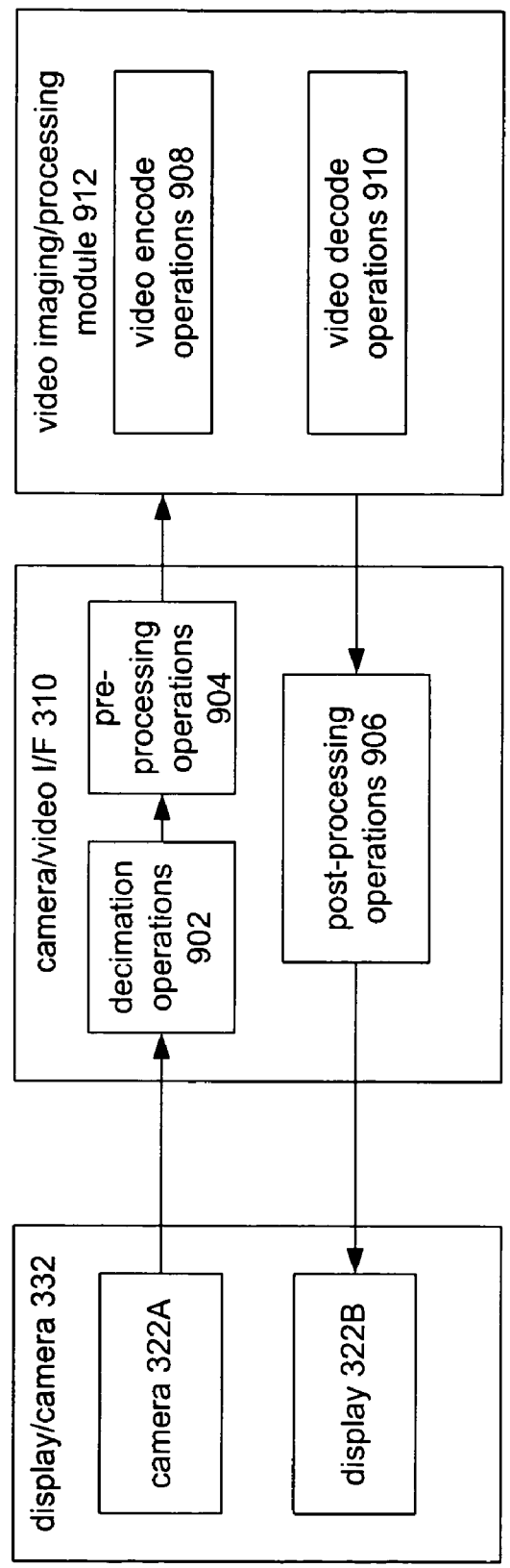
FIG. 7 provides a functional block diagram of a video processing core engine.

FIG. 7 is a block diagram illustrating a video/image processing core engine 900 within a wireless terminal. Core engine 900 may service MPEG-1/2/4, H.261/H.263, other like video compression standards, or any other like video encoding/decoding operations as well, e.g., JPEG, etc. MPEG4 is particularly suited to wireless video phones as MPEG4 allows a reasonable reproduction of the video frame with a relatively low data rate. Camera 322A and display 322B are built into the wireless terminal, such as a GSM wireless terminal, and correspond to LCD and Camera 332 of FIG. 3. Camera 322A and display 322B couple to video I/F 310. Decimation operations 902, pre-processing operations 904 and post-processing operations 906 may be performed by video I/F 310. The pre-processing includes format conversion such as UYVY format decimation from camera interface output to YUV12 format and also performs Noise reduction. This decimation at the video I/F 310 may utilize complex decimation pattern to resize a received image having a source resolution to the native pixel resolution of the display. Post processing functions include De-blocking, Up-scaling of the QCIF or CIF image to the required resolution of the display, Dithering, and/or Conversion from YUV12 format to RGB color format. Video encoder functions 908 and video decoder functions 910 include motion processing operations and are performed by a video processor 912. Video processor 912 may includes dedicated hardware, such as the motion processor accelerator 311, and optional video processor accelerator 328 as shown in FIG. 3.

Figure 8:
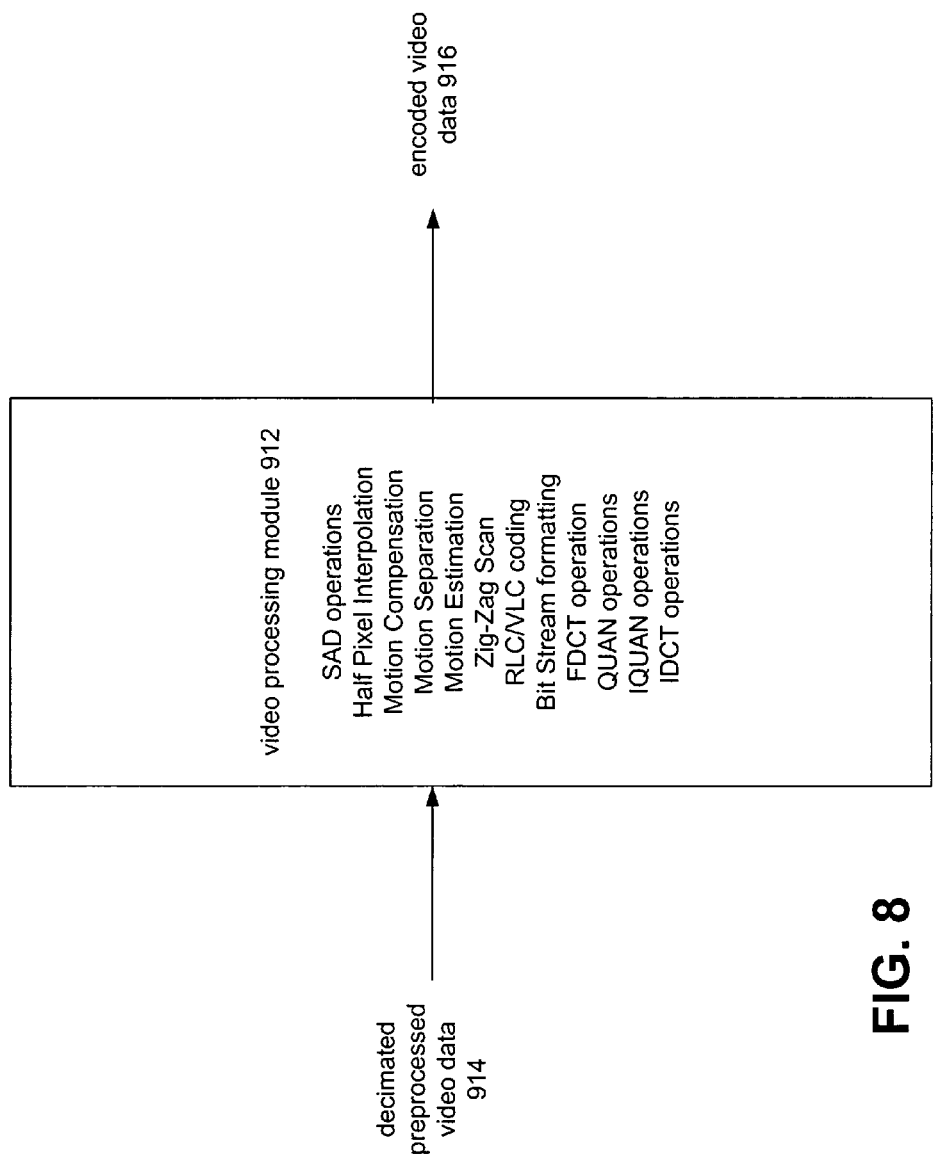
FIG. 8 depicts typical operations performed within the video processing module.

By decimating the image within the video I/F encoding video processing operations of the video processing core engine 900 may be greatly reduced. Here, the encoding of the preprocessed decimated video data 914 video data is performed within video processing module 912. This module may include an ARM, motion processor accelerator and optional video accelerator module to produce encoded video data 916. The video processing module may be required to perform SAD, motion half-pixel interpolation, motion compensation and motion separation between frames, Fast Discrete Cosine Transform (FDCT) operations, Quantization (QUAN) operations, Inverse Quantization (IQUAN) operations, Inverse Discrete Cosine Transform (IDCT) operations, zigzag operations, Run Length Coding/Variable Length Coding (RLC/VLC) operations, and Bit stream formatting operations as illustrated in FIG. 8.

Both encoding and decoding may be performed at the macro-block level. In one embodiment, each macro-block contains 4 8×8 Y components, one 8×8 U components and one 8×8 V components. The driver of the video processing module performs reference macro-block generation, motion compensation in case of the inter-macro block encoding. The unit supports imaged-based motion compensation or half-pixel block-based compensation.

For quantization, the H.263 based simple uniform quantization scheme, MPEG4 based matrix quantization scheme, or other known schemes may be supported. The quantization parameter QP adjusts the quantization level. For example, QP may take integer values between 1 and 31. For matrix based quantization, an 8×8 quantization matrix can be either customized or a default matrix. Mis-match control may be performed prior to the de-quantization data being processed by the IDCT function. It may be based on the sum of all 64 de-quantized values and implemented within the IDCT module.

Figure 9:
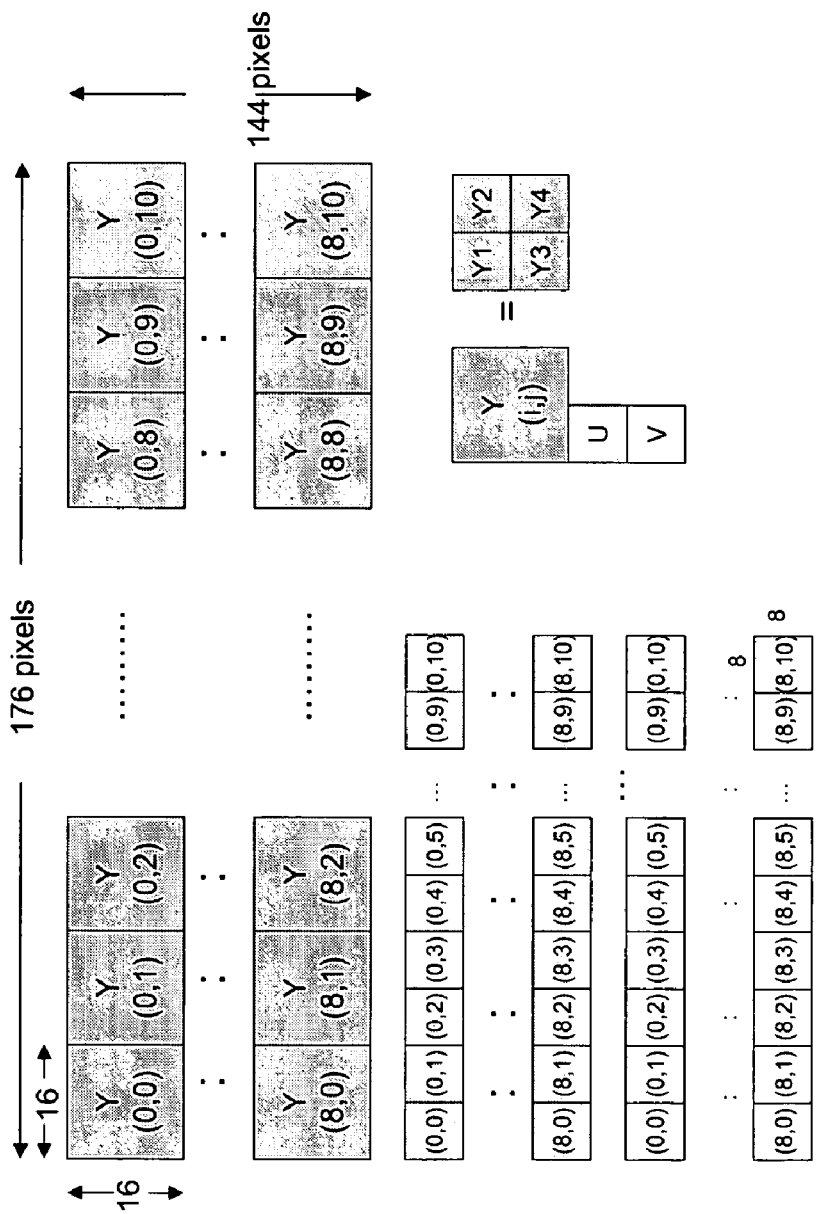
FIG. 9 provides a block diagram of the data structure or potential data structure utilized by video information discussed within the present invention.

The image format and data structure of a captured QCIF frame may be described with reference to FIG. 9. The particulars of the data structure inform the video processing module which required operations are to be performed. At a macro-block level, each macro-block contains 4 luminance blocks Y0, Y1, Y2, Y3, two chrominance blocks U and V. Each block contains 8×8 pixel information. The pixels of the captured frame in YUV formats are store in the memory where an example of QCIF frame is used. Each macro-block is uniquely identified by its location (x_pos, y_pos) in the memory. The pixels of the corresponding Y luminance and the two chrominance blocks are identified by their individual starting memory address. For example if the memory addresses of the Y, U & V for the captured frame start at pY, pU and pV, respectively, then the address pointer for Y1-Y4, U, V blocks of the macro-block (x_pos, y_pos) are as follows:

Y1: $pY + y\_pos * 16 * frame\_width + x\_pos * 16$

Y2: $pY + y\_pos * 16 * frame\_width + x\_pos * 16 + 8$

Y3: $pY + y\_pos * 16 * frame\_width + x\_pos * 16 + 8 * frame\_width$

Y4: $pY + y\_pos * 16 * frame\_width + x\_pos * 16 + 8 * frame\_width + 8$ $$U: \quad pU + \text{y\_pos} * 8 * \frac{\text{frame\_width}}{2} + \text{x\_pos} * 8$$

$$V: \quad pV + \text{y\_pos} * 8 * \frac{\text{frame\_width}}{2} + \text{x\_pos} * 8$$

Figure 10B:
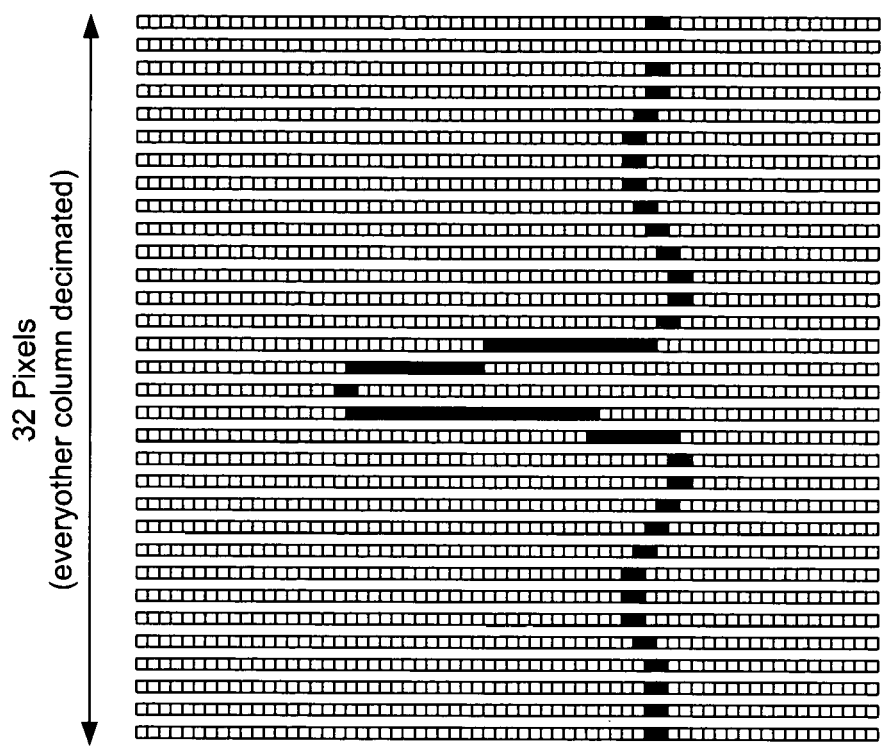
FIGS. 10A, 10B, 10C and 10D illustrate the decimation of an image with a constant integer decimation pattern.
Figure 10A:
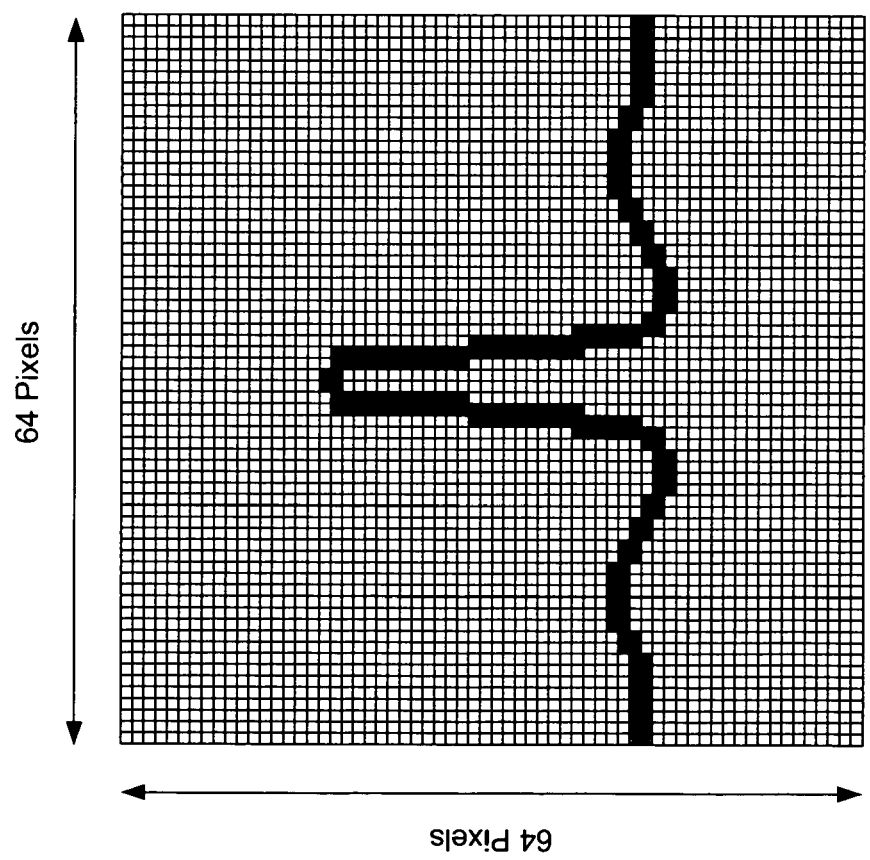
Figure 10D:
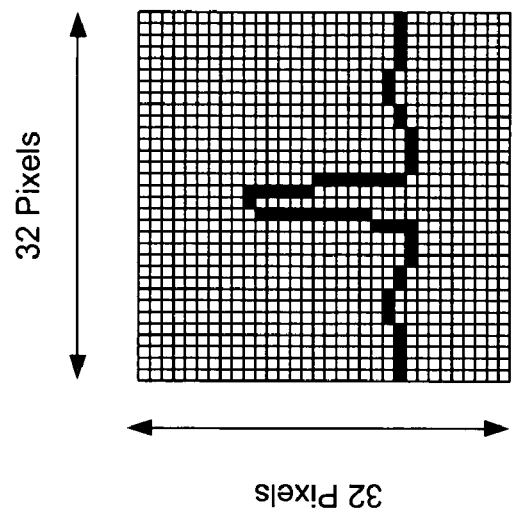

If motion estimation is performed on ±m pixels, then frame_width=actual_captured_frame_width+2*m FIGS. 10A through 10D illustrate one type of decimation process. Interpolations or decimation are operations used to magnify and reduce sample signals or in this case images. This is usually done by an integer factor. Magnification of an image requires new values not present in the original image to be computed and inserted between existing data points or pixels. In decimation a new value is calculated from a neighborhood of samples and replaces these values in a minimized image. Alternatively samples or pixels may be removed from the image. Integer factor decimation algorithms have been implemented using decimation to allow an image dimension to typically be changed by integer factors. For example decimation as shown in FIGS. 10A through 10D reduce the size of a one-dimensional array by a factor of two and thus reduces the overall size of the image depicted in FIG. 10A to one of ¼ the original size as depicted in FIG. 10D.

Figure 10C:
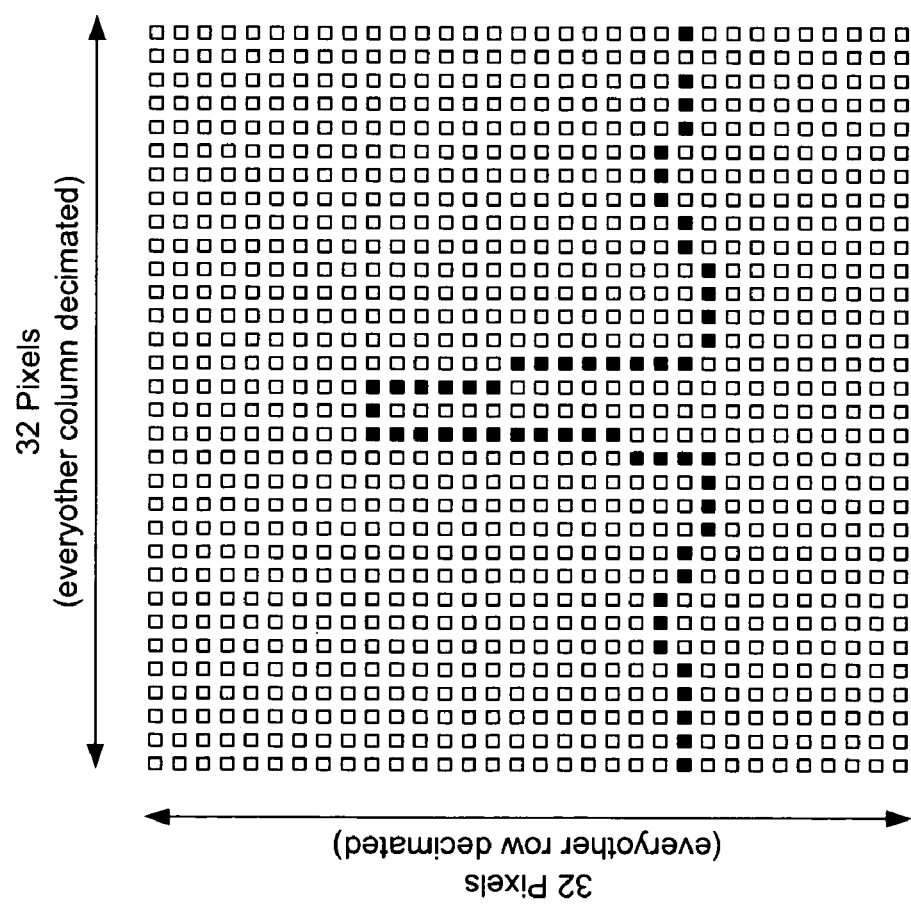

In FIG. 10A an image is depicted as being made of an array of 64 columns by 64 rows, (4096 pixels). Although the image is shown in black and white it should be understood that color data, such as red, green, blue, brightness and luminosity data may also be contained and associated with each individual pixel. In FIG. 10B the image of FIG. 10A is horizontally decimated wherein the integer factor is taken such that there is one undecimated column in between each decimated column. In FIG. 10C horizontal decimation occurs to remove one row from in between each undecimated row. This results in a matrix of 32 by 32 pixels as shown in FIG. 10D. Although FIGS. 10A through 10D show the decimated pixels being removed it is possible that other embodiments may create a new value for each group of pixels based on the values of that group of pixels.

The same decimation pattern was applied horizontally and vertically in FIGS. 10B and 10C, to maintain the same aspect ratio of the image in FIGS. 10A and 10D. This type of decimation maintains a constant integer number of undecimated rows or columns between the decimated rows or columns. When a constant number of undecimated rows and columns are maintained, only specific or discreet relationships between the undecimated image and the decimated image can be achieved. For example using integers of 1, 2, 3, and 4 allows the decimated image to be 25%, 44.44%, 56.25% and 64% of the undecimated image. However these discreet relationships do not always exist between acquired images or received image files and the display on which they will be presented. Further, using a non-integer factor typically requires polynomial interpolation techniques resulting in somewhat slower algorithms not presently conducive to real time presentation of images within the wireless environment.

Given the large number of different resolutions associated with input sensors and image files it is conceivable that the relationship between the source resolution of the image and the native resolution of the display may require another means to match these differing resolutions. Further, this situation also arises when an arbitrary portion of an image is selected for display or is magnified. The use of a non-constant (complex) integer decimation pattern allows the original image or selected portion of an image to be decimated for presentation on a display screen having a different resolution having a non-discrete relationship with the original image. Non-constant (complex) integer decimation patterns do not maintain a constant number of undecimated columns or rows in between decimated columns or rows. For example, a simple complex decimation pattern may involve decimating first every fourth row and/or column and then every third row and/or column and then repeating this simple sequence. However more complex sequences are possible. In another example it is possible to have N rows or columns between decimated rows or columns for X numbers of time followed by M rows or columns between decimated rows or columns for Y numbers of time wherein this pattern eventually repeats itself. The complex decimation pattern derives from a comparison between the source or original resolution of the image or selected portion of an image and the arbitrary resolution associated with a display on which the image will be presented. Then a video processor may decimate the image prior to any additional processing of the image. This complex decimation pattern allows the decimation of an image having a source resolution to a second or arbitrary resolution which may be associated with a display.

Figure 11B:
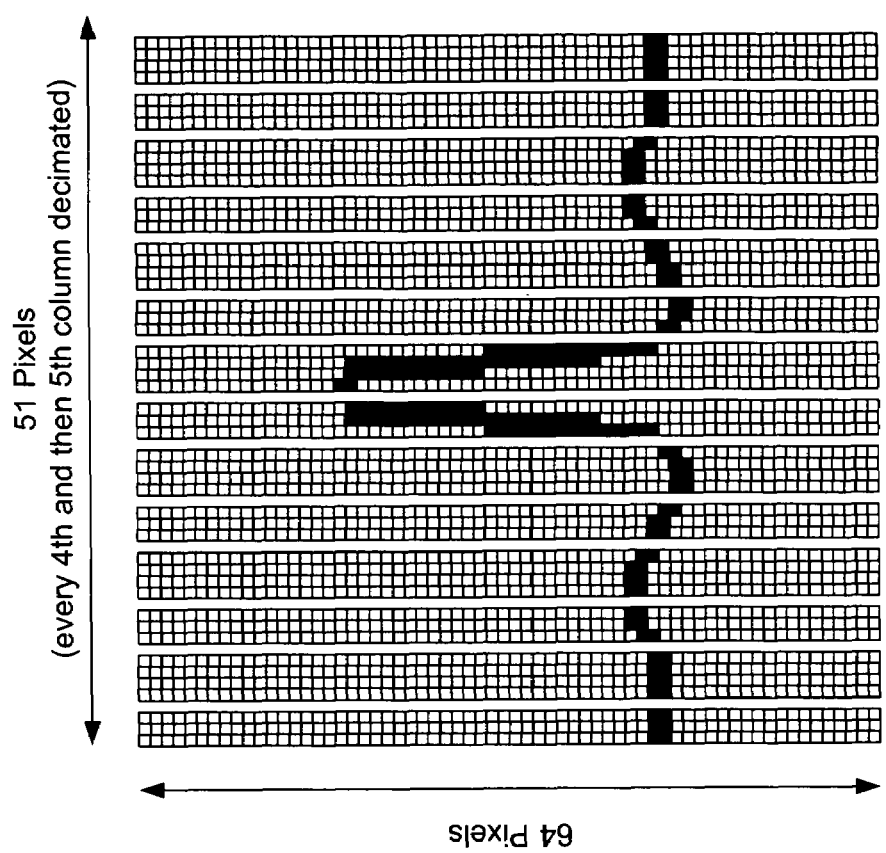
FIGS. 11A, 11B, 11C and 11D illustrate the decimation of an image with a complex integer decimation pattern.
Figure 11A:
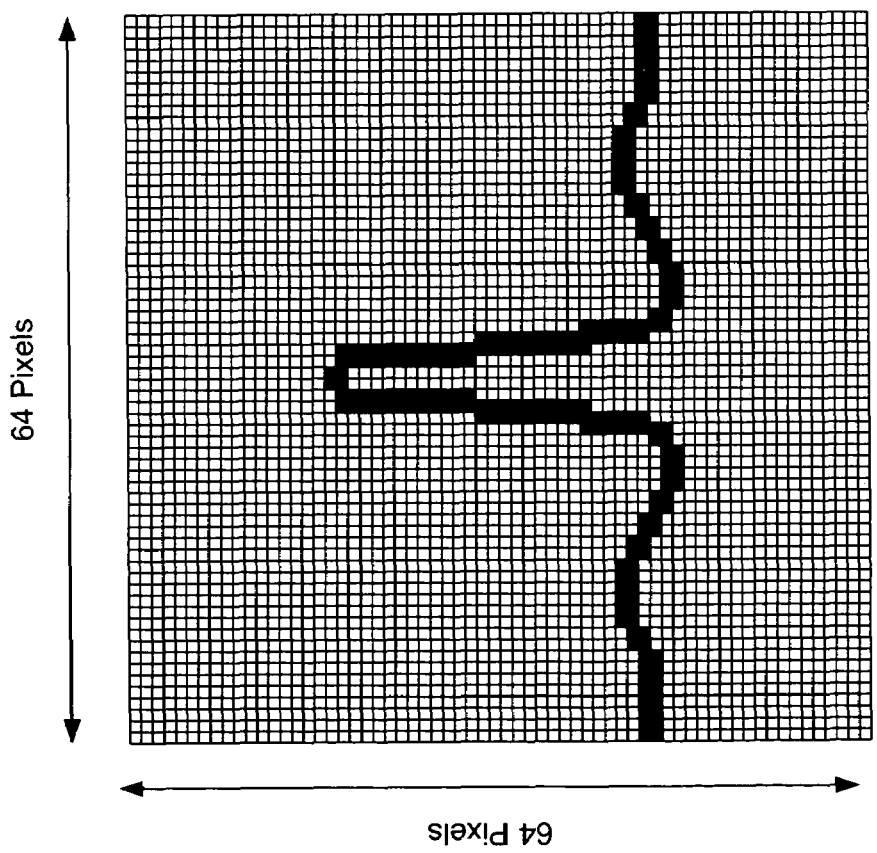
Figure 11D:
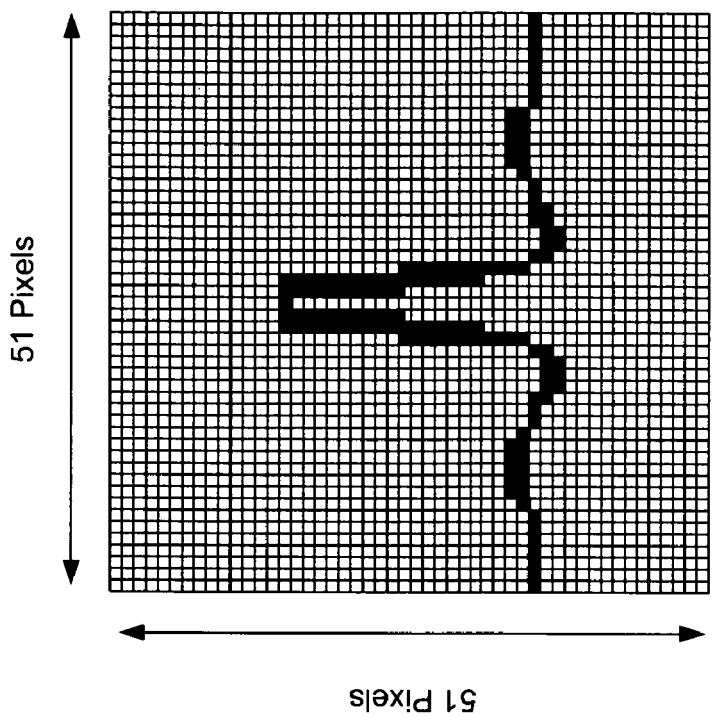
Figure 11C:
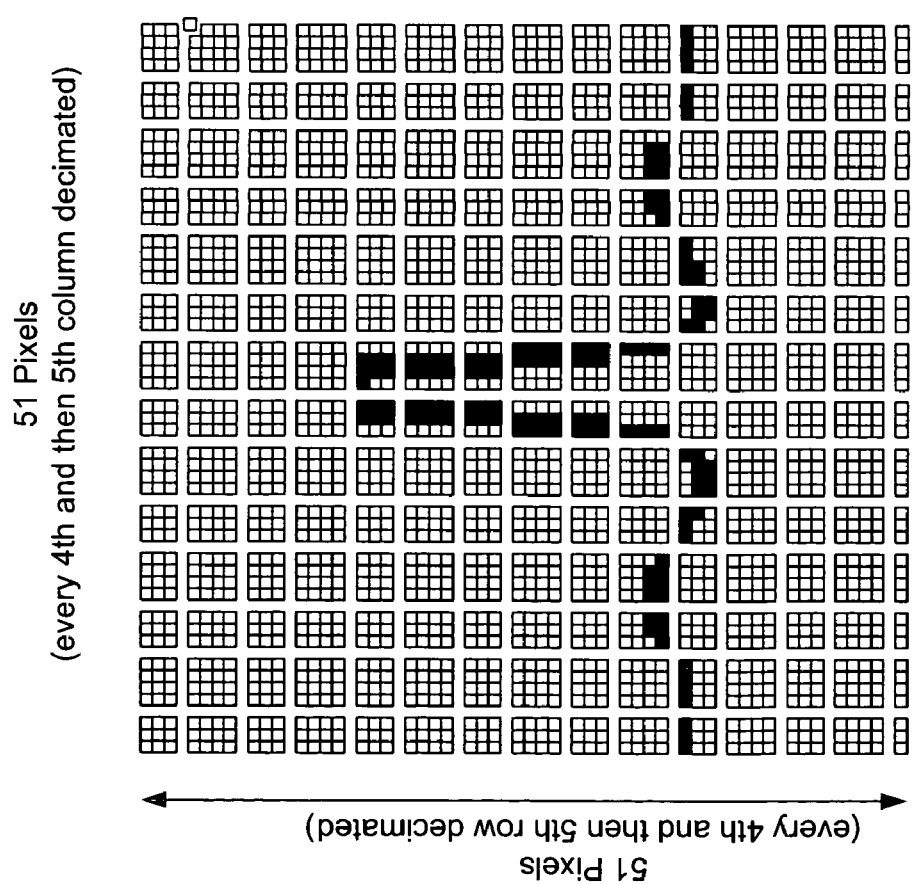

In FIG. 11A an image is depicted as being made of an array of 64 columns by 64 rows, (4096 pixels). In FIG. 11B the image of FIG. 11A is vertically decimated with a non-constant integer factor is taken such that there are three undecimated columns before a first decimated column and then four undecimated columns before the next decimated column. This decimation pattern then repeats. In FIG. 11C a non-constant integer factor is taken such that there are three undecimated rows before a first decimated row and then four undecimated rows before the next decimated row. This decimation pattern then repeats horizontally. This results in a matrix of 51 by 51 pixels as shown in FIG. 11D. Although FIGS. 11A through 11D show the decimated pixels being removed it is possible that other embodiments may create a new value for each group of pixels based on the values of that group of pixels. The same decimation pattern was applied horizontally and vertically in FIGS. 11B and 11C, to maintain the same aspect ratio of the image in FIGS. 11A and 11D. This type of decimation maintains a non-constant integer number of undecimated rows or columns between the decimated rows or columns. When a non-constant number of undecimated rows and columns are maintained any arbitrary relationship desired between the undecimated image and the decimated image can be achieved.

Returning to FIG. 7, one potential use of such a technique associated within a wireless terminal may be described. Camera sensor 322A such as that associated with camera/display 322 of FIG. 3 may have various resolutions depending on the quality of the sensor. For example, different models of wireless terminals based on a common platform may use many different visual sensors having different visual resolutions (i.e. a 1.3 mega-pixel camera sensor versus a 4 mega-pixel camera sensor). Typically an image collected from camera sensor 322A may be presented on display 322B (i.e. a LCD).

In one particular embodiment, camera sensor 322A has a resolution of 1280×960 pixels while display 322B, which is used to preview the image has a resolution of 400×280 pixels. The comparison of these two resolutions clearly indicates there is not a discrete relationship between these resolutions. For example this is not a 1200×900 pixel image being converted to a 600×450 pixel image where the decimated image is 25% of the original image. In that instance there would be a definite discrete relationship where linearly the image is one half of the original image or overall is one fourth the area of the original image. Therefore a complex decimation pattern may be required to decimate the image gathered by the sensor at 1280×960 pixels in order to achieve a 400×280 pixel resolution.

Camera interface or video interface 310 coupled to the video imaging/processing module 916 will generate a complex decimation pattern to be implemented on the output of camera 322A, received image file or selected portion of an image. By decimating the image from the sensor before significant post-processing occurs, memory and processing resources within the wireless system associated with processing the image for display may be used more efficiently for alternative tasks Thus the image processing associated with LCD display 322B can be greatly streamlined by a complex decimation pattern. In another embodiment the video processing module may receive the image within a data block received by the wireless terminal. Then the video interface 310 may decimate the image prior to post processing of the original graphical image to be displayed within the wireless terminal.

Figure 12:
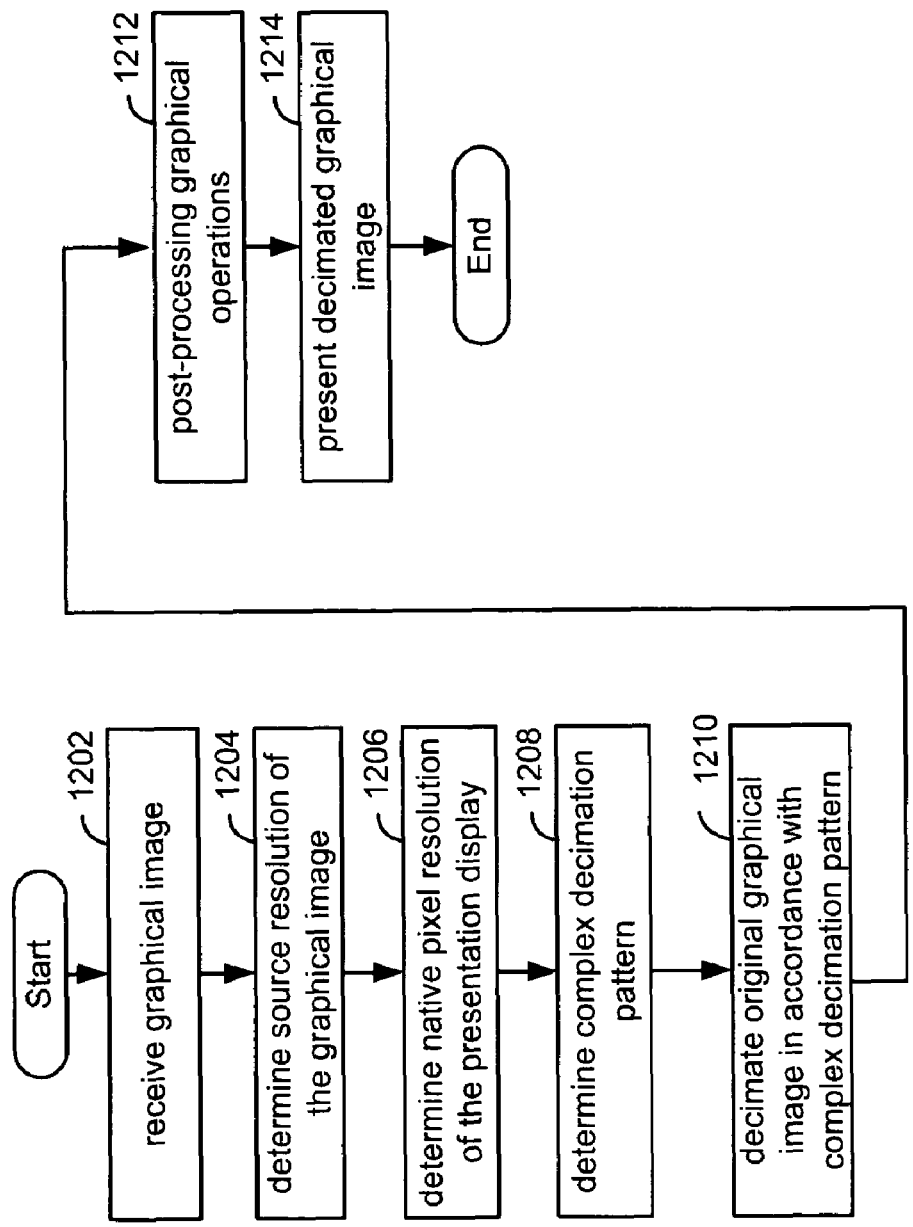
FIG. 12 provides a logic flow diagram illustrating the processes associated with presenting a graphical image having an original resolution within a display having an arbitrary resolution.

FIG. 12 provides a logic flow diagram illustrating the processes associated with presenting a graphical image having a predetermined resolution within a display having an arbitrary resolution. Operations begin with a video or graphical interface receiving the graphical image in step 1202. The graphical image may be received from a sensor such as a camera having a predetermined or selectable resolution, or may be received as a graphics data file. In Step 1204 a determination is made as to the source resolutions of the graphical image received in Step 1202. Next in step 1206, it is necessary to determine the native pixel resolution or the arbitrary resolution associated with the presentation display on which the graphical image will be presented. Based on the source resolution of the graphical image and the arbitrary resolution associated with the display, a complex whole number or integer decimation pattern will be developed in step 1208. This complex decimation pattern is one in which the number of undecimated columns or rows between decimated columns and rows does not remain constant. In step 1210 the original graphical image is decimated in accordance with the complex decimation pattern. This decimation is performed prior to post-processing of the graphical image within step 1212. Thus, any resources which would typically be used for post-processing of the portions of the graphical image which would typically be decimated or not presented in the display are freed. In step 1214 the decimated graphical image is presented on the display. It may be desirable in certain environments to maintain a constant aspect ratio between the original graphical image and the decimated graphical image. Although this is desirable, it may not always be the case. This process allows multiple models of a wireless terminal or other device having a graphics or image capturing device such as a camera wherein the different models are based on a common platform with different peripheral options such as camera to be utilized. Thus, a common processing system may be used with a variety of graphical capture or image capture sensors or devices. This method may be applied to graphical images within various graphical image standards such as the MPEG standards and JPEG standards.

In summary, the present invention provides a system and method of presenting graphical images within a wireless terminal. This method includes receiving an original graphical image, having a source resolution, to be presented on a display screen. The native pixel resolution associated with the display screen may differ from that of the original graphical image. A complex decimation pattern determined using a computer system or algorithm allows the original graphical image to be resized from the source resolution of the original graphical image to a decimated resolution operable to be displayed within the native resolution of the display screen. Once this complex decimation pattern has been determined, the original graphical image may be decimated according to the pattern in order that the decimated graphical image may then be presented on the display screen. Decimated pixels need not be further processed to produce the processing requirements imposed on the system processor. This allows the operations normally associated with the decimated portions of the image to be offloaded from the processing module in order to improve the overall system efficiency.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to present a graphical image within a wireless terminal, which comprises:
   receiving an original graphical image to be presented on a display screen;
   determining a source resolution of the original graphical image;
   determining a native pixel resolution associated with the display screen;
   determining a complex decimation pattern, wherein the complex decimation pattern allows the original graphical image to be resized from the source resolution of the original graphical image to a decimated resolution operable to be displayed within the native resolution of the display screen;

decimating the original graphical image according to the complex decimation pattern; and presenting the decimated graphical image on the display screen.

2. The method of claim 1, wherein the complex decimation pattern comprises a repeating integer pattern, wherein all integers within the pattern are not equal, and wherein the complex decimation pattern describes a number of undecimated horizontal and/or vertical lines separating decimated horizontal and/or vertical lines.

3. The method of claim 2, wherein the aspect ratio of the original graphical image and the decimated graphical image remains constant.

4. The method of claim 2, wherein the repeating integer program is determined based on comparing the source resolution of the original graphical image and the native resolution of the display screen.

5. The method of claim 1, wherein decimating the original graphical image according to the complex decimation pattern occurs prior to processing the original graphic image.

6. The method of claim 1, wherein the original graphical image is received by a camera interface from a camera sensor, and wherein the camera interface decimates prior to post-processing of the original graphical image.

7. The method of claim 1, wherein the original graphical image is received within a data block received by the wireless terminal, and wherein the camera interface decimates prior to post-processing of the original graphical image.

8. The method of claim 1, wherein the wireless terminal receives and processes graphical images according to a graphical image standard selected from the group of graphical image standards consisting of moving picture expert group MPEG standards; joint photographic experts group (JPEG) standards; MPEG1, MPEG 2, MPEG 4, MPEG 7, and MPEG 21 standards.

9. The method of claim 1, wherein the wireless terminal operates according to the GSM standard.

10. The wireless terminal of claim 1, wherein the original graphical image is received within a data block received by the wireless terminal, and wherein the camera interface decimates prior to post-processing of the original graphical image.

11. The method of claim 1, wherein the wireless terminal receives and processes graphical images according to a graphical image standard selected from the group of graphical image standards consisting of moving picture expert group MPEG standards; joint photographic experts group (JPEG) standards; MPEG1, MPEG 2, MPEG 4, MPEG 7, and MPEG 21 standards.

12. A wireless terminal that comprises:
a Radio Frequency (RF) front end;
a baseband processor communicatively coupled to the RF front end;
a camera operable to capture graphical images;
a display screen operable to display graphical images;
a camera interface that receives captured graphical images and processes the captured graphical images for display within the display screen, and wherein the camera interface is operable to:
determine a source resolution of the graphical image;
determine a native pixel resolution associated with the display screen;
determine a complex decimation pattern, wherein the complex decimation pattern allows the graphical image to be resized from the source resolution to a decimated resolution operable to be displayed within the native resolution of the display screen;
decimate the graphical image according to the complex decimation pattern; and
a video processor operably coupled to the camera interface, wherein the video processor is operable to process video information within the wireless terminal according to a video standard.

13. The wireless terminal of claim 12, wherein the complex decimation pattern comprises a repeating integer pattern, wherein all integers within the pattern are not equal, and wherein the complex decimation pattern describes a number of undecimated horizontal and/or vertical lines separating decimated horizontal and/or vertical lines.

14. The wireless terminal of claim 13, wherein the aspect ratio of the original graphical image and the decimated graphical image remains constant.

15. The wireless terminal of claim 13, wherein the repeating integer program is determined based on comparing the source resolution of the original graphical image and the native resolution of the display screen.

16. The wireless terminal of claim 13, wherein the preprocessing functions comprise:
UYVY format decimation from camera interface output to YUV12 format; and
Noise reduction.

17. The wireless terminal of claim 13, wherein the post-processing functions comprise:
de-blocking;
image scaling to match display resolution;
dithering; and
conversion from YUV12 format to RGB color format.

18. The wireless terminal of claim 12, wherein decimating the original graphical image according to the complex decimation pattern occurs prior to processing the original graphic image.

19. The wireless terminal of claim 12, wherein the wireless terminal operates according to the GSM standard.

20. The wireless terminal of claim 12, wherein the camera interface performs pre-processing functions and post-processing functions.

21. A video processing module within a wireless terminal operable to perform complex decimation on graphical images to be display on a display screen within the wireless terminal comprising:
a graphics interface operable to receive an original graphical image to be presented on the display screen, wherein a source resolution is associated with the original graphical image;
a display screen having a native pixel resolution, wherein the display screen is operably coupled to the graphics interface, and wherein the graphics interface is operable to:
determine a complex decimation pattern that allows the original graphical image to be resized from the source resolution of the original graphical image to a decimated resolution operable to be displayed within the native resolution of the display screen;
decimating the original graphical image according to the complex decimation pattern; and
provide the decimated graphical image to the display screen; and
a video processor to process the original graphical image.

22. The video processing module of claim 21, wherein the original graphical image is received from a camera within the wireless terminal.

23. The video processing module of claim 21, wherein the complex decimation pattern comprises a repeating integer pattern, wherein all integers within the pattern are not equal, and wherein the complex decimation pattern describes a number of undecimated horizontal and/or vertical lines separating decimated horizontal and/or vertical lines.

24. The video processing module of claim 23, wherein the aspect ratio of the original graphical image and the decimated graphical image remains constant.

25. The video processing module of claim 23, wherein the repeating integer program is determined based on comparing the source resolution of the original graphical image and the native resolution of the display screen.

26. The video processing module of claim 23, wherein decimating the original graphical image according to the complex decimation pattern occurs prior to processing the original graphic image.

27. The video processing module of claim 21, wherein the original graphical image is received within a data block received by the wireless terminal, and wherein the camera interface decimates prior to post-processing of the original graphical image.

28. The video processing module of claim 21, wherein the wireless terminal receives and processes graphical images according to a graphical image standard selected from the group of graphical image standards consisting of moving picture expert group MPEG standards; joint photographic experts group (JPEG) standards; MPEG1, MPEG 2, MPEG 4, MPEG 7, and MPEG 21 standards.

29. The video processing module of claim 21, wherein the wireless terminal operates according to the GSM standard.

* * * * *